United States Patent [19]

Wu

[11] Patent Number: 4,596,501

[45] Date of Patent: Jun. 24, 1986

[54] MULTIPLE CUTTER PASS FLANK MILLING

[75] Inventor: Chung Y. Wu, Mississauga, Canada

[73] Assignee: Pratt & Whitney Canada Inc., Longueuil, Canada

[21] Appl. No.: 583,214

[22] Filed: Feb. 24, 1984

[30] Foreign Application Priority Data

Feb. 8, 1984 [CA] Canada .................................. 447017

[51] Int. Cl.$^4$ .............................................. B23C 3/18
[52] U.S. Cl. .................................... 409/131; 318/574; 409/84
[58] Field of Search ................. 29/56.5; 409/131, 132, 409/84, 85, 80; 318/574, 570, 578; 364/474

[56] References Cited

U.S. PATENT DOCUMENTS

| 2,480,807 | 8/1949 | De Vliet | 409/84 |
| 4,031,809 | 6/1977 | Shraiman | 409/132 X |
| 4,176,992 | 12/1979 | Ross et al. | 409/131 |
| 4,533,286 | 8/1985 | Kishi et al. | 409/80 |

FOREIGN PATENT DOCUMENTS

| 14563 | 8/1980 | European Pat. Off. | 409/84 |
| 120915 | 9/1980 | Japan | 409/131 |
| 194855 | 11/1982 | Japan | 409/84 |
| 5501683 | 4/1985 | Japan | 409/80 |
| 312690 | 10/1971 | U.S.S.R. | 409/84 |
| 688297 | 10/1979 | U.S.S.R. | 409/132 |
| 738785 | 6/1980 | U.S.S.R. | 409/132 |

OTHER PUBLICATIONS

"Tool Positioning and Feedrate Problems in Impeller Flank Milling" by C. Y. Wu, Y. Altintas, and R. A. Thompson, Proceedings of 1982 Canadian Conference on Industrial Computer Systems, McMaster University, Hamilton, Ontario, Canada (May 1982), (Canadian Industrial Computer Society).
Computerized Compressor Design by Melvin Platt reprinted from Turbomachinery International, May, Jun. 1981.
Automated N/C Machining of Radial Turbomachinery.

Primary Examiner—William R. Briggs
Attorney, Agent, or Firm—Schwartz, Jeffery, Schwaab, Mack, Blumenthal & Evans

[57] ABSTRACT

A method of flank milling complex surfaces comprising the steps of analyzing the design surface to determine discrete areas in which straight lines can be drawn, determining straight lines in the discrete areas, transposing the coordinates of these straight lines and comparing them with the flank tool cutter positions, determining the tool positions to said straight lines, back generating the contact lines of said surface and comparing these with the design surface, determining the number of passes of said cutter tool and generating data for numerical control machining.

8 Claims, 14 Drawing Figures

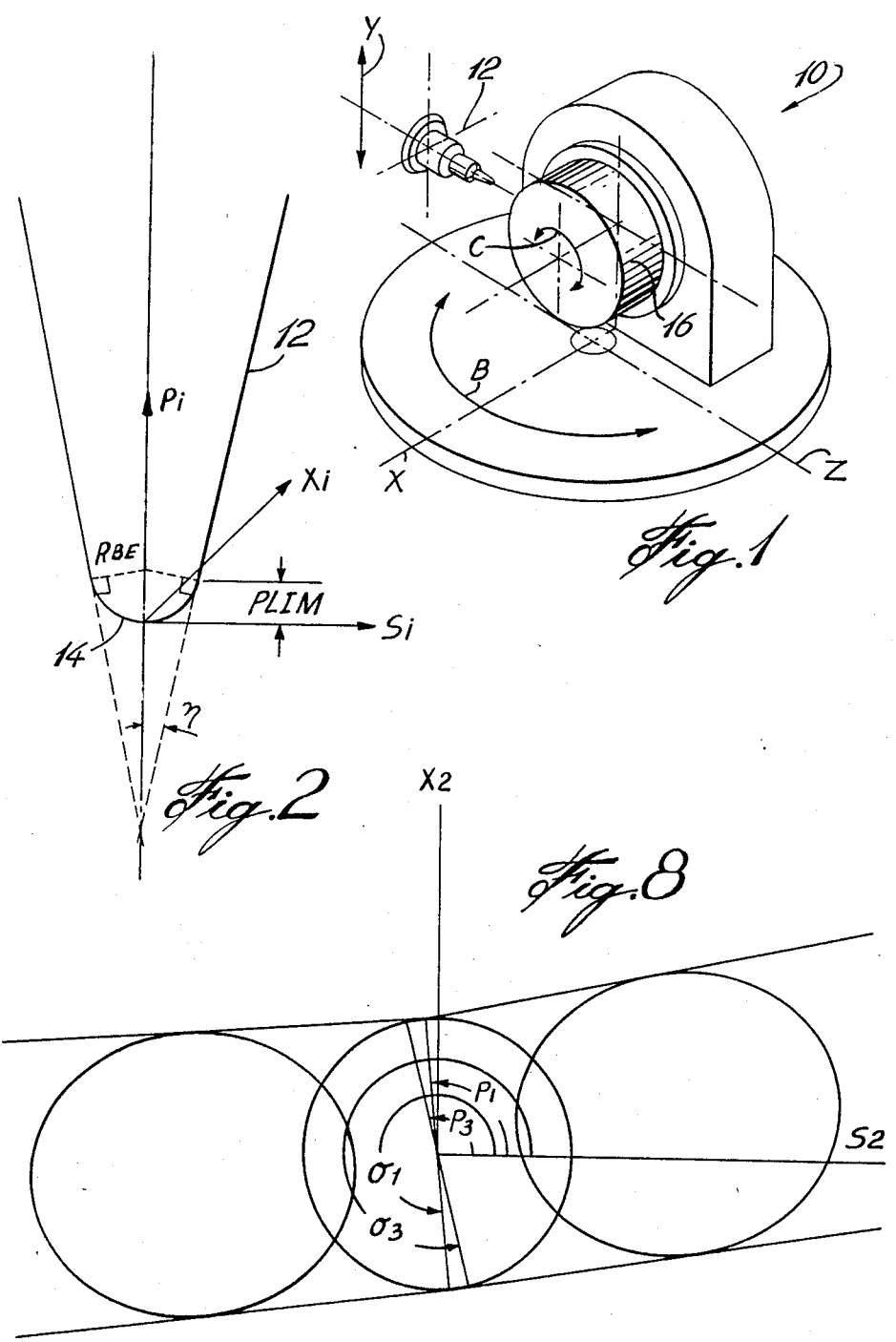

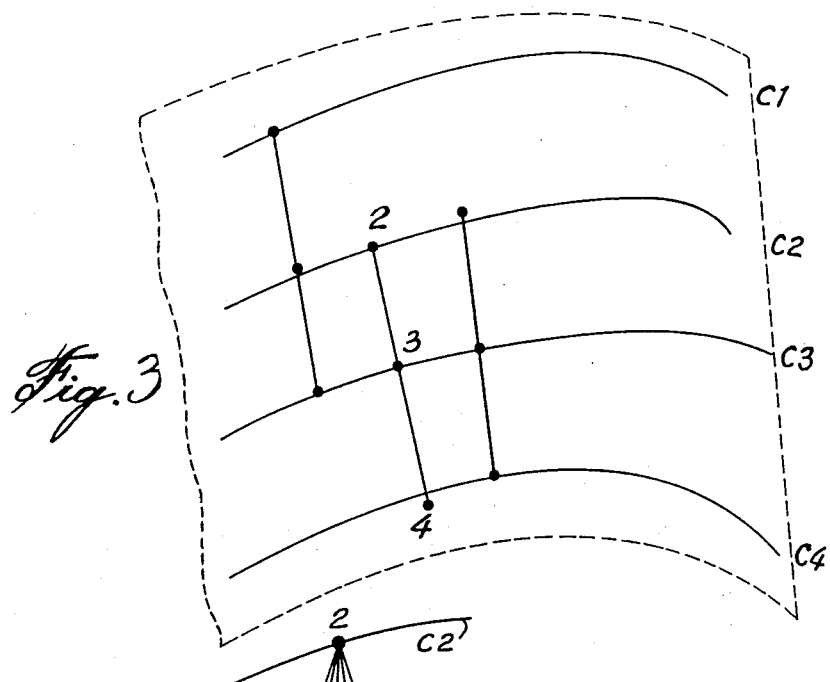
Fig. 3
Fig. 4
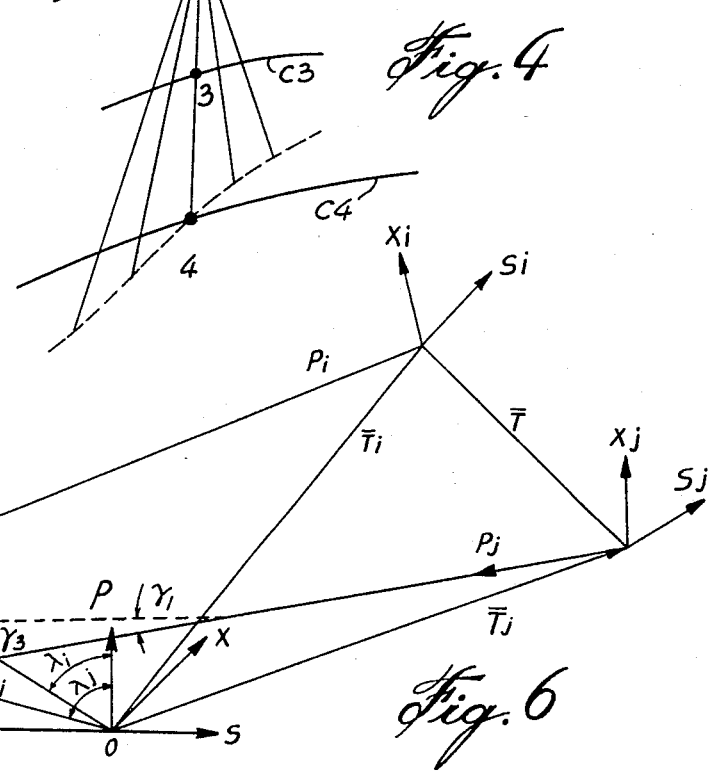
Fig. 6

MULTIPLE CUTTER PASS FLANK MILLING

BACKGROUND OF THE INVENTION

1. Field of the Invention

The present invention relates to a method of flank milling, and more particularly, the manufacturing of rotor components of turbomachinery, such as impellers and blisks.

2. Description of the Prior Art

The manufacture of radial turbomachinery, including centrifugal compressor impellers and axial compressor or turbine rotors, was either done by casting or by machining. In the case of a centrifugal impeller, casting is the most common method. However, there are well-known problems associated with casting, such as shrinkage and distortion of thin blade sections. The resulting inaccuracies in casting of the blades on an impeller make it impractical to consider fine tuning of the designs since manufacturing errors, in fact, exceed any such changes. As far as milling or machining an impeller blade from a solid block such as a titanium block is concerned, it has been known to use a point milling system on a multi-axis milling machine whereby the surface of the blade is predetermined and each minute area of the surface is machined by the tip of a drill bit. Such milling machines are numerically controlled, and the programs or tapes for operating point milling of an impeller, for instance, is, as can be readily understood, intolerably long and the machining process is time consuming.

Attempts have been made in the past to use flank milling techniques. It is generally conceived that a surface is flank millable if it can be closely approximated to a surface generated by a straight line or a ruled surface. Even given such a surface, the problems of defining the tool path and the cutter feed rate are complex. To complicate the problem further, the milled surface may deviate from the ruled surface, sometimes quite significantly, owing to the twist of the surface along a straight line component. Such deviations have hitherto been ignored or minimized by compromising the aerodynamic design of the blade.

In spite of such difficulties, flank milling has been increasingly used since it offers improved productivity relative to point milling. As described in "A Software System for the Automated Numerical Control Machining of Radial Turbomachinery", a brochure published by Northern Research and Engineering Corporation, of Woburn, Mass., flank milling can lend itself to the manufacture of centrifugal impellers for aviation turbomachinery since the blades' surfaces of such impellers can be designed by straight line generation or ruled surfaces without significant compromise of the aerodynamic design. On the other hand, axial compressor rotors hardly lend themselves to flank milling because of the twist in the blades. Even though flank milling is now well accepted for the manufacture of impellers, compressor or turbine rotor disks are still manufactured as separate blades and disks (rotor hub). The individually forged blades are attached to the disk with a conventional fir tree root arrangement and are riveted to the disk. Attempts have been made to mill a rotor with integral blades from a solid forged blank giving rise to the coined term "blisk" from the words "blade" and "disk". For the purposes of the present specification, the word "blisk" will be utilized.

SUMMARY OF THE INVENTION

It is an aim of the present invention to provide a method whereby the obvious advantages of flank milling can be utilized in a manufacturing method for producing more complex surfaces, that is, surfaces which are not readily analyzed as ruled surfaces, such as in the formation of blisks for turbomachinery as well as to turbomachinery impellers with blades having increased design sophistication, that is, not limited to straight line generation.

A further aim of the present invention is to provide a method of predicting a resulting surface from a proposed surface design and to better program a numerically controlled flank milling machine for producing such a surface.

It is a further aim of the present invention to provide a method of flank milling non-ruled surfaces of turbomachinery by providing for multiple finishing passes of the cutter tool and coordinating the number of passes to provide matching of said passes.

Given a surface to be machined, a method of flank milling in accordance with the present invention comprises the steps of first determining a surface to be machined, selecting discrete portions of said surface, determining three or more reference surfaces intersecting said discrete surface, the intersection of said reference surfaces with the proposed surface resulting in reference lines, selecting a point on one of said reference lines and determining a straight line passing through said selected point and intersecting with two other adjacent reference lines, orienting the rotating axis of a cutting tool relative to the discrete surface, determining and programming the best cutter tool position to correspond to the selected straight line and repeating the method until all cutter tool positions have been determined, making a first finishing pass to machine a ruled surface between at least two reference lines, and repeating the process for making further passes between other reference lines.

In a more specific method of the present invention, at least three reference lines are selected with the number of lines being proportional to the degree of curvature of the surface such that three adjacent reference lines are selected and at least one straight line can intersect three adjacent reference lines or at least approximate an intersection with the third line, and in a first instance, determining a straight line relative to a predetermined point in a first reference line and the points of intersection of said straight line in a second and third reference line is determined from which the position of the cutting tool can be determined for a first pass at least between adjacent reference lines, and a point is determined on a second reference line and the points of intersection on third and fourth lines of a straight line passing through the selected point on the second line is determined for a second pass of the cutter tool at least between two other reference points.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a perspective view of a schematic representation of a detail of a 5-axis milling machine;

FIG. 2 is a diagram of the end of a cutting tool;

FIG. 3 is a diagram of a detail of the method of the present invention;

FIG. 4 is a diagram of a detail shown in FIG. 3;

FIG. 6 is a diagram comparing the tool coordinate system with the blisk coordinate system;

FIG. 8 is a cross-section through one of the reference planes of the three cutter tool positions shown in FIG. 7.

DESCRIPTION OF THE PREFERRED EMBODIMENTS

Figure 5:
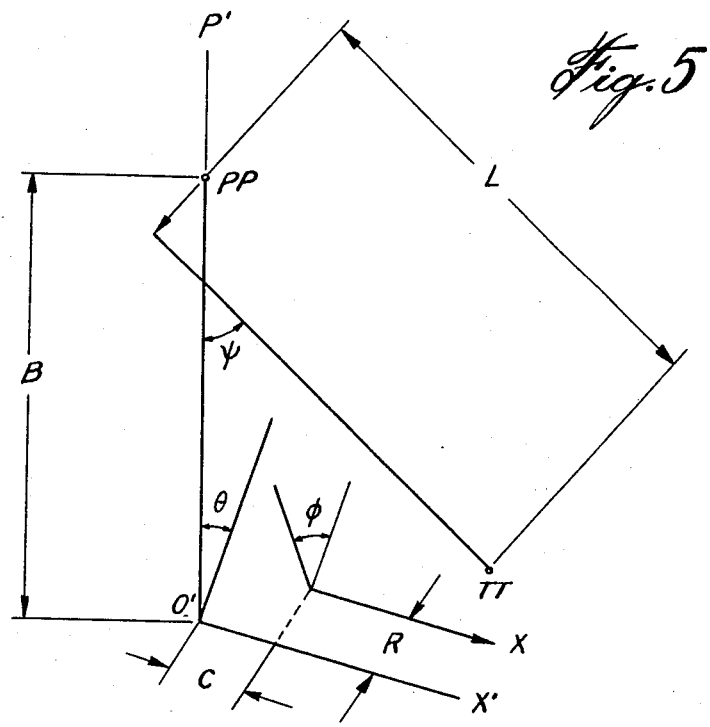
FIG. 5 is a diagram showing the orientation of a tool cutter axis relative to the axis of a turbomachinery blisk-/impeller to be machined.

Referring now to the drawings and more particularly to FIG. 1, a 5-axis milling machine is schematically illustrated and referred to by the numeral 10. The cutter tool is represented by the numeral 12 and includes a conical cutting tool as illustrated in FIG. 2. The milling machine 10 could be a 5-axis milling machine, such as a Sundstrand OM-1 5-axis NC milling machine. The five movements of the machine are represented as follows by two rotary movements B and C and three translatory movements X, Y and Z. The cutter tool 12, as shown in FIG. 2, is preferably a conical cutter having a conical surface angle $\eta$ to the axis Pi of the tool. The tool has a spherical tip 14. It has been found that such conical cutting tools have better strength than the cylindrical tool, and tool deflection and breakage are minimized. $R_{BE}$ is the ball-end radius of the tool. ($P_1$, $X_1$, $S_1$) is a left-handed rectangular coordinate system with its origin at the tip of the ball end. For $P_i > $ PLIM, the cutter surface is conical; for $P_i \leq $ PLIM, it is spherical.

A blisk, now shown, may be manufactured from a solid annular titanium blank 16. On a predetermined design blade surface shown in dotted lines in FIG. 3, four planes have been defined which intersect the proposed blade surface and result in reference lines C1, C2, C3 and C4 on the surface of the blade.

It has been found that for a typical ruled surface, anywhere from 20 to 50 straight lines are needed for each blade surface. Thus, 20 to 50 points are selected on any one of the various reference lines C1, C2, C3 and C4, and ruled surfaces are determined joining three reference lines, thereby ensuring that any straight line defining a ruled surface extends and intersects at least three reference lines. For instance, in FIG. 4, if point 2 is selected on C2, we extend straight lines through point 2, past point 3 on C3 until they intersect the surface of revolution formed by C4. By numerical interpolation, the coordinates of the straight line intersecting all three reference lines can be exactly determined. By repeating this analysis through 20 to 50 points, the number of straight lines, all passing through at least three adjacent reference lines, can be determined and transposed to the program for operating the cutting tool. Depending on the position of the straight lines, a determination can also be made as to the number of cutting tool passes which will be needed to complete the surface of the given rotor blade.

Referring now to FIG. 5, the cutter is shown relative to the rotor. The 5-axis coordinates are $\psi$, $\theta$, L, R, A, plus three parameters B, C, and $\phi$, which are offset constants for a particular blade surface. The orientation of the tool axis is defined by $\psi$ and $\theta$, while R is the distance between the tool axis and the rotor axis. B gives the projection of the radial coordinate of the tool pivot point on the plane containing the tool axis. The letter C in FIG. 5 denotes the axial coordinate of the tool pivot point, while the letter A is the distance of the tool axis from the tool pivot point, and is the angle between the vertical and the leading edge datum plane of the blade. The tool axis lies on the P'O'X' plane.

Reference is made to a paper entitled "Tool Positioning and Feedrate Problems in Impeller Flank Milling" by C. Y. Wu, Y. Altintas, and R. A. Thompson, Proceedings of 1982 Canadian Conference on Industrial Computer Systems, McMaster University, Hamilton, Ontario, Canada (May 1982), (Canadian Industrial Computer Society). It is understood that the following determination is typical to the milling machine described hereinabove. Other known methods may be used depending on the milling machine used.

An important step is to transfer the five coordinates into rectangular coordinates with respect to the rest frame of the rotor. P, X, S is the system that rests with respect to the rotor, with the X-axis along the axis of the rotor and pointing from the leading edge towards the trailing edge. Pi, Xi, Si is the rectangular coordinate system in the rest frame of the tool at position i. The Xi-axis is chosen to be in the plane P'O'X' of FIG. 5. Then a point on which coordinates are Pi, Xi, Si on the tool coordinate system becomes the point P, X, S on the rotor coordinate system with:

$$\begin{bmatrix} P \\ X \\ X \end{bmatrix} = \begin{bmatrix} T_{Pi} \\ T_{Xi} \\ T_{Si} \end{bmatrix} + \qquad (1)$$

$$\begin{bmatrix} \cos(\phi - \theta)\cos\psi & \cos(\phi - \theta)\sin\psi & \sin(\phi - \theta) \\ -\sin\psi & \cos\psi & 0 \\ -\sin(\phi - \theta)\cos\psi & -\sin(\phi - \theta)\sin\psi & \cos(\phi - \theta) \end{bmatrix} \begin{bmatrix} P_i \\ X_i \\ S_i \end{bmatrix}$$

where ($T_{Pi}$, $T_{Xi}$, $T_{Si}$) is the coordinate vector of the tool ball end tip in the rest frame of the rotor. It is given by $$\begin{bmatrix} T_{Pi} \\ T_{Xi} \\ T_{Si} \end{bmatrix} = \begin{bmatrix} R\sin(\phi - \theta) + D\cos(\phi - \theta) \\ L\sin\psi - A\cos\psi + C \\ R\cos(\phi - \theta) - D\sin(\phi - \theta) \end{bmatrix} \qquad (2)$$

with $$D = B - L\cos\psi - A\sin\psi \qquad (3)$$

Given a point (Pi, Xi, Si) with respect to the tool coordinate system at position i, this transformation allows one to compute its coordinate (Pj, Xj, Sj) with respect to the tool coordinate system at position j (FIG. 6). The relative orientation of the two coordinate systems set up at the ball end tip 14 of the tool 12, and the coordinate system at rest with the rotor is shown in FIG. 6. Two inclined planes can be constructed with their common edge coinciding with the rotor axis, that is, the X-axis. Pi lies on the inclined plane which makes an angle $\lambda_i$ with the vertical P-axis. Pj lies on the inclined plane which makes an angle $\lambda j$ with the P-axis, where $$\lambda_i = \phi - \theta_i$$

$$\lambda_j = \phi - \theta_j \qquad (4)$$

$\theta_i$ and $\theta_j$ being the $\theta$ values of the 5-axis coordinate $\theta$ at tool positions i and j. Pi and Pj axes make angles $\psi_i$ and $\psi_j$ with the PS plane; where again $\psi_i$ and $\psi_j$ are the $\psi$ values of the 5-axis coordinate $\psi$ at tool positions i and j.

Xi-axis is chosen to lie on the inclined plane containing the Pi-axis. This completely defines the (Pi, Xi, Si) coordinate system. We then chose the Xj-axis to lie on a plane parallel to the inclined plane containing Pi and Xi for reasons which will soon be clear. Thus we have also completely specified the (Pj, Xj, Sj) coordinate system.

$\gamma_1$ is the angle between the Pj-axis and the inclined plane containing Pi and Xi. If the Pj- and Sj-axis is rotated by an angle $-\gamma_1$ about the Xj-axis, then both the Pj- and Sj-axis would lie on a plane parallel to the inclined plane containing Pi and Xi. The rotated Pj-axis now makes a different angle with the PS plane. This angle is equal to $\gamma_3$ in FIG. 6. Now if another rotation of angle $\gamma_2 = \gamma_3 - \psi_i$ about the Sj axis is applied, the $j^{th}$ tool coordinate system has been made parallel to the $i^{th}$ tool coordinate system.

The angles $\gamma_1$ and $\gamma_2$ are readily obtained by arbitrarily assigning $OA = 1$, then it is simple trigonometry that $$\gamma_1 = \sin^{-1}(\sin(\theta_j - \theta_i)\cos\psi_j)$$

$$\gamma_2 = \tan^{-1}(\tan\psi_j \sec(\theta_j - \theta_i)) - \psi \qquad (5)$$

The matrix of rotation associated with a rotation of $-\gamma_1$ about the Xj-axis is $$(-\gamma_1)_{Xj} = \begin{bmatrix} \cos\gamma_1 & 0 & \sin\gamma_1 \\ 0 & 1 & 0 \\ -\sin\gamma_1 & 0 & \cos\gamma_1 \end{bmatrix} \qquad (6)$$

and that associated with a rotation of $\gamma_2$ about the Sj-axis is $$(\gamma_2)_{Sj} = \begin{bmatrix} \cos\gamma_2 & \sin\gamma_2 & 0 \\ -\sin\gamma_2 & \cos\gamma_2 & 0 \\ 0 & 0 & 1 \end{bmatrix} \qquad (7)$$

Referring to FIG. 6 again, let $\overline{T}_i$ and $\overline{T}_j$ be the vectors from the origin of the rotor reference frame to the tip 14 of the tool at positions i and j respectively; then $$\overline{T} = \begin{bmatrix} T_P \\ T_X \\ T_S \end{bmatrix} = \overline{T}_j - \overline{T}_i = \begin{bmatrix} T_{Pj} \\ T_{Xj} \\ T_{Sj} \end{bmatrix} - \begin{bmatrix} T_{Pi} \\ T_{Xi} \\ T_{Si} \end{bmatrix} \qquad (8)$$

gives the separation of the $j^{th}$ tool tip from the $i^{th}$ tool tip, measured in the rest frame of the rotor. However, this separation is to be obtained measured in the $i^{th}$ tool position coordinate system. This is again achieved by applying two rotations to $\overline{T}$. The first is an angle $\lambda_i$ about X-axis:

$$(\lambda_i)_X = \begin{bmatrix} \cos\lambda_i & 0 & -\sin\lambda_i \\ 0 & 1 & 0 \\ \sin\lambda_i & 0 & \cos\lambda_i \end{bmatrix} \qquad (9)$$

Then we rotate $-\psi_i$ about the S-axis $$(-\psi_i)_S = \begin{bmatrix} \cos\psi_i & -\sin\psi_i & 0 \\ \sin\psi_i & \cos\psi_i & 0 \\ 0 & 0 & 1 \end{bmatrix} \qquad (10)$$

Putting all the previous considerations together, one may see that given any point (Pj, Xj, Sj) in the $j^{th}$ tool reference frame, its coordinates in the $i^{th}$ tool reference frame are $$\begin{bmatrix} P_i \\ X_i \\ S_i \end{bmatrix} = (-\psi_i)_S (\lambda_i)_X \begin{bmatrix} T_P \\ T_X \\ T_S \end{bmatrix} + (\gamma_2)_{Sj}(-\gamma_1)_{Xj} \begin{bmatrix} P_j \\ X_j \\ S_j \end{bmatrix} \qquad (11)$$

where $\overline{T}$ as given by (8) is readily obtained by applying equation (2).

Figure 7:
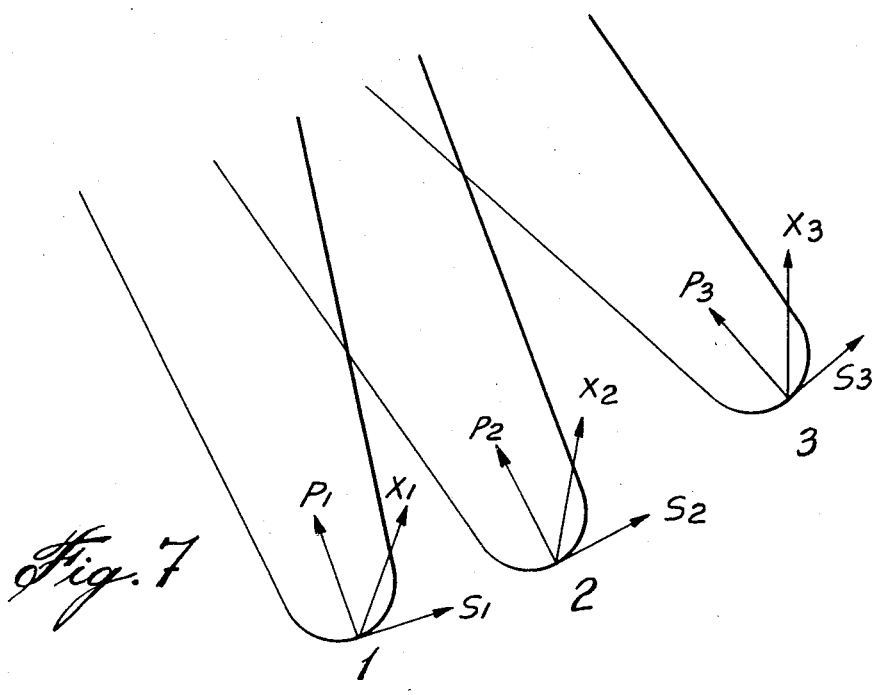
FIG. 7 is a diagram showing three cutter tool positions.

In order to determine the line of contact between the tool at position i and the straight lines determined as previously mentioned, one can consider a triplet of adjacent tool positions as illustrated in FIG. 7. If a line of contact at tool position 2 is required, a family of reference planes perpendicular to the $P_2$-axis are constructed at different values of $P_2$. The cross-sections of the tool at position 2 with the reference planes are always circles as shown in FIG. 8. Thus, the cross-sections of the tool 12 at positions 1 or 3 can be an ellipse, circle or part ellipse and part circle, depending on whether the reference plane cuts the conical surface part or the spherical ball end part or both parts of the tool.

Referring to FIG. 8, the conic sections 1, 2 and 3 will be referred to. Between the conic sections 1 and 2, common straight line tangents can be constructed, one on each side of the straight line joining their centers. Let $\sigma_1$ and $\rho_1$ be the angular positions of the tangency points on the second tool position, measured with respect to the $S_2$-axis. Similarly, between the tool positions 2 and 3, $\sigma_3$ and $\rho_3$ are the tangency points. If the three tool positions are sufficiently close together and the tool positions are smoothly varying, then $\sigma_1 \approx \sigma_3$ and $\rho_1 \approx \rho_3$ (note, however, that $\sigma_1 \neq \sigma_3 \pm 180°$, $\rho_1 \neq \rho_3 \pm 180°$) and $\sigma_2 = (\sigma_1 + \sigma_3)/2$, $\rho_2 = (\rho_1 + \rho_3)/2$ give the angular positions of the points of contact on the sectioning plane between the tool at position 2 and the resultant surfaces. In reality, only one of these, either $\sigma_2$ or $\rho_2$ give the point of contact with the blade surface, be it on the pressure surface side or on the suction surface side, while the other point of contact relates to the tool clearance surface. It is, of course, important that a tool clearance surface be provided so that the tool does not cut into the blade surface of an adjacent blade.

In order to carry out this procedure, each conic section shown in FIG. 8 must be expressed mathematically in a common coordinate system chosen to be the ($P_2$, $X_2$, $S_2$) system. In its own reference frame, the tool surface at position j is described by $$Xj^2 + Sj^2 = \alpha Pj^2 + \beta Pj + \gamma \qquad (12)$$

where for $Pj \leq PLIM = R_{BE}(1 - \sin \eta)$ $$\alpha = -1$$

$$\beta = 2R_{BE}$$

$$\gamma = 0, \qquad (13)$$

we have a spherical surface. While for $Pj > PLIM$, $$\alpha = \tan^2 \eta$$

$$\beta = 2R_{BE} \tan \eta (\sec \eta - \tan \eta)$$

$$\gamma = R_{BE}(\sec \eta - \tan \eta)^2 \qquad (14)$$

we have a conical surface.

For tool position 2, the circular cross-section is described by letting $P_2$ equal to the height of the sectioning plane H from the tip of the ball-end. For positions 1 or 3, however, the first equation (12) must be transformed by using equation (11) so that the tool surface can be described in the reference frame $(P_2, X_2, S_2)$; then $P_2$ is set equal to H. In general, this leaves an equation of the form $$aS_2^2 + bX_2^2 + cS_2X_2 + dS_2 + eX_2 + f = 0 \qquad (15)$$

where a, b, c, d, e, and f are constants independent of $S_2$, $X_2$; but depends on all the parameters we have defined by equations (2) through (11).

Equation (15) can describe any conic section in general. However, what we have here is either a circle, or a near circle ellipse because the reference plane is always nearly perpendicular to the tool axis. If the reference plane is well above the spherical ball end of the tool at position 1 or 3, then an elliptic cross-section is what is important; otherwise, two different equations (15) must be considered, one describing an ellipse associated with the conical surface, and the other describing a circle associated with the spherical ball-end surface, for each of the tool positions at 1 or 3.

To find the tangency point for conic sections 1 and 2, the following procedure is followed. At any angular position $\sigma$ on conic section 2, we can obtain a tangent to it defined by $$X_2 = mS_2 + n \qquad (16)$$

where m and n are the slopes and intercept. Solving (15) and (16) simultaneously for $S_2$, provides a quadratic equation. If the discriminant of this equation is positive, the tangent cuts conic section 1 at two real points; if the discriminant is negative, the tangent misses conic section 1; if it is zero, the tangent just touches conic section 1 and it is therefore the common tangent we are looking for. In experiments, the search for the common tangent was done iteratively, using the method of bi-sectioning. In the case when the sectioning reference plane is well above the ball end, the correct $\sigma$ in one such search was obtained. If the sectioning plane is close to the ball end, however, after obtaining the common tangent when conic section 1 is entirely on the conical surface, a test must be made as to whether or not the tangency point on conic section 1 is a point on the conical surface of the real tool. To do so, the coordinates of the tangency point on conic section 1 in the $(P_2, X_2, S_2)$ frame must be computed. This is then transformed to the $P_1, X_1, S_1$ frame using equation (11). If $P_1 > PLIM$, the tangency point we obtained is a real point on the tool and the common tangent has been found. Otherwise, the common tangent is fictitious, and the search must be repeated. This time, however, conic section 1 is a circle lying entirely on a sphere of radius $R_{BE}$. After finding $\sigma_1$ and $\rho_1$ by constructing common tangents between conic sections 1 and 2, the same procedure to find $\sigma_3$ and $\rho_3$ between conic sections 3 and 2 is repeated. The averages of the $\sigma_s$ and $\rho_s$ provide the angular positions of the points of contact. Their coordinates in the $(P_2, X_2, S_2)$ frame are readily obtained. Then, equation (1) is used to transform them to the rest frame of the rotor.

By repeating the above procedure with different sectioning reference planes, as many points of contact as wanted can be obtained between the surfaces and the tool at a certain tool position. These points then define the lines of contact.

The above procedure gives us the projected milled surface of the blade. This can now be compared with the earlier described procedure for determining the ruled surface or the straight line analysis of discrete portions of the blade. The milled surface should be compared with the design surface before actual milling is done to determine whether the milled surface is acceptable. Such back generation is done by stacking 20 to 50 lines of contact of particular surface defining the milled surface. The coordinates of any point on the blade surface can be readily interpolated.

From the back generated surfaces, the design surfaces can be compared with the predicted milled surfaces. In a particular example, a rotor blade was compared at its tip, its mid section and near the hub. Between the tip and mid section, the milled surface was within proper tolerances. Below the mid section, discrepancy between the design and back generated milled surfaces increased such that the maximum deviations for each surface, near the trailing edge, approaches 0.050 inch, i.e., the milled surface would be 0.100 inch thicker than the design blade profile near the hub section trailing edge. This was unacceptable since the design blade had a thickness of 0.030 inch.

While the rough passes remain unchanged, a second finishing pass was introduced. This time the conical cutting surface of the tool was matched to the straight line of the reference lines C3 and C4. This gave the proper contour to the blade between the mid and hub sections. If the second pass did not cut into this blade surface between the tip and the mid section which were cut during the first pass, and if the two passes join smoothly along the mid line of the blade, satisfactory results would be obtained. In the particular example, the second pass resulted with surfaces from the first pass overlapping closely with the ruled surface.

It was only after the back generation had been carried out and further passes had been made that the numerical controlled tape was prepared for the 5-axis machine.

Figures 9A, 9B, 9C:
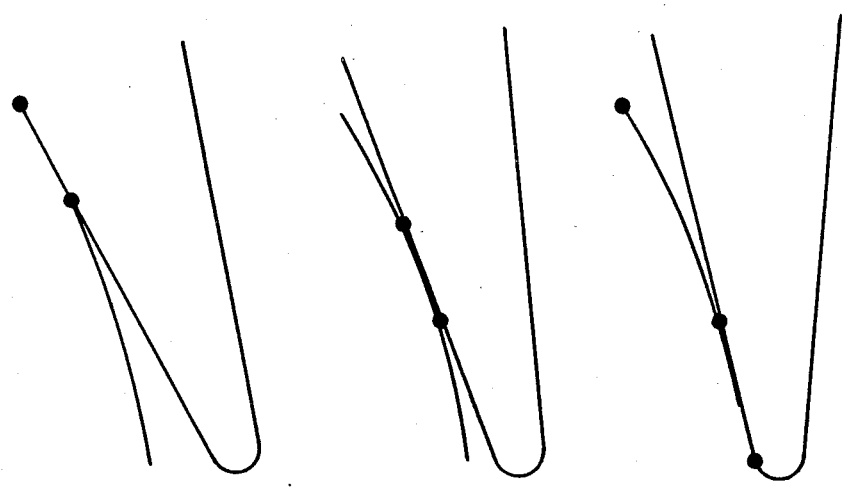
FIGS. 9a-f are a plurality of diagrams showing the cutter tool with different complex surfaces.
Figures 9D, 9E, 9F:
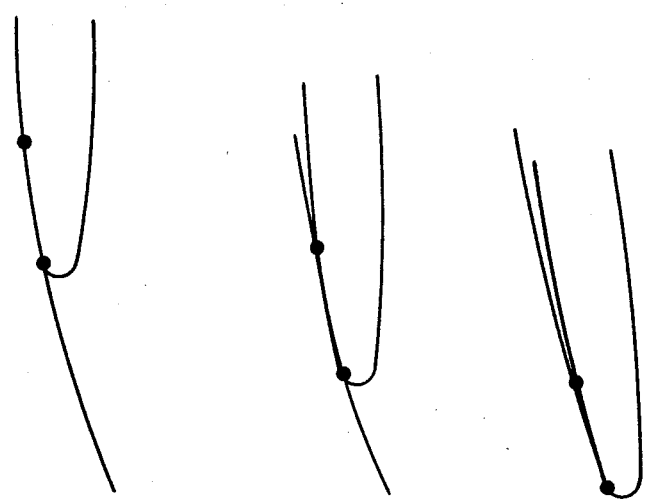

Referring now to FIG. 9, there is shown, schematically in 9a to 9c, a convex surface being cut in successive passes by the conical cutting tool. In the case of a concave surface, the cutting tool can be shaped as shown in FIGS. 9a to f. These latter Figures show the cutting of the concave surface by three successive passes. Note that each pass covers a discrete area where a straight line can be approximated. It is understood that the size of the discrete areas, i.e., the distance between the intersecting planes C1, C2, C3, C4, is determined by the degree of curvature of the surface.

I claim:

1. A method of flank milling complex surfaces comprising the steps of first determining a surface to be machined, establishing the relative position of a cutter tool contact surface relative to said surface to be machined, selecting a discrete portion of said surface, determining three or more reference planes intersecting said discrete surface, the intersection of said reference planes with the proposed surface resulting in reference curves, selecting a point on one of said reference curves and determining the straight line projecting through said selected point and intersecting with two other adjacent reference curves, determining the cutter tool position which corresponds to the contact surface of said cutter tool closest to said selected straight line and repeating the method until all cutter tool positions have been determined, back generating the projected surface from said cutter tool positions, comparing the back generated surface with the design surface, making a first finishing pass to machine a ruled surface between at least two reference curves and determining and making further finishing passes to machine ruled surfaces between other reference curves.

2. A method of fabricating a rotor component for turbomachinery in accordance with the method of claim 1 comprising selecting a blank, selecting a 5-axis milling machine having a flank cutter tool of cone shape, predetermining the design of the surfaces of the blade on the rotor for each blade surface, first analyzing discrete surface areas and determining straight line generation in the discrete surface area, determining the coordinates on tool axis from which the contact surfaces of the cone shaped cutting tool can be determined, relative to the coordinates of the ruled surfaces, comparing the coordinates of the contact surfaces with the design criteria, determining the number of passes required of the flank cutting tool to provide the finished surface, repeating the steps for each surface of the rotor and generating the data for the numerically controlled 5-axis milling machine and thereby machining the rotor component.

3. A method in accordance with claim 1, wherein at least four parallel reference curves are selected in the discrete surface and a number of curves selected is proportional to the degree of curvature of the surface whereby three adjacent reference curves are selected in close enough proximity that a straight line can intersect three adjacent reference curves, selecting a predetermined point on a first reference curve and the points of intersection of the straight line in a second and third reference curve is determined from which the position of the cutting tool can be determined for a first pass at least between adjacent reference curves, determining a point on a second reference curve and proceeding to project straight lines through the second point so as to intersect with the third and fourth curves, and determining from the straight line generation the number of passes necessary for the cutter tool to machine the required surface.

4. A method as defined in claim 1, wherein the complex surface to be defined is part of a rotor component for turbomachinery.

5. A method as defined in claim 4, wherein the rotor component is a blade on a blisk, and each blade includes a pressure side and a suction side and one side of the blade requires from several ruled surfaces defined by straight line generation.

6. A method as defined in claim 5, wherein a blisk is formed by machining a one-piece blank to form the rotor disc and rotor blades by flank milling.

7. A method as defined in claim 4, wherein the rotor component so formed is a one-piece impeller for a centrifugal compressor comprising an axial component and a radial component, the impeller including a plurality of blades and a hub, the hub and the blades being formed by flank milling.

8. A method as defined in claim 3 wherein a number of reference curves in addition to 4 is selected in the discrete areas.

* * * * *